April 5, 1949.

H. PFLEUMER 2,466,271

METHOD OF MAKING ELECTRIC POWER
TRANSMISSION CABLES
Filed Dec. 18, 1941

INVENTOR.
Hans Pfleumer
BY Samuel Ostrolenk
ATTORNEY

Patented Apr. 5, 1949

2,466,271

UNITED STATES PATENT OFFICE 2,466,271

METHOD OF MAKING ELECTRIC POWER TRANSMISSION CABLE

Hans Pfleumer, New Brunswick, N. J., assignor to Rubatex Products, Inc., New York, N. Y., a corporation of Delaware Application December 18, 1941, Serial No. 423,492

3 Claims. (Cl. 154—2.28)

My invention relates in general to the field of electrical power transmission and distribution, and more particularly concerns a method of making novel improved form of cable particularly adapted for the transmission of power across water or the like.

In various marine installations such as dredging barges or the like, it is often advantageous to utilize machinery on the floating vessel which is energized by electrical power transmitted from a shore station.

Generally this is economically feasible since it permits the use of electric motors and the like upon the barge rather than steam driven equipment. In such instances, the power is transmitted to the electrical apparatus aboard the vessel by floating cables which are laid across the surface of the water and are connected to the power station or source of electrical energy on the shore. Heretofore, however, the use of electrical power aboard a ship operating within a specific area has been definitely restricted, inasmuch as the cables transmitting power thereto would often sink and so effectively disable the dredging equipment or the like for a considerable time.

In order that the power transmission cable be made to float, it has been customary in one form to utilize cables with floats attached thereto at regularly spaced intervals. This procedure, however, was comparatively inconvenient since the cable with the attached floats could not be wound upon the retrieving reel when not in use and thus occupied considerable space and was difficult to transport from point to point.

In another modification, a hollow cable was employed in the form of a drawn or otherwise fabricated copper tube having an insulating coat thereabout. This type of cable could be wound on a reel but presented a distinct disadvantage in that the cable was subject to puncture by passing vessels or if used for military purposes, by bullets and as a result would permit the influx of water and thus sink. Under these conditions the cable would have to be retrieved, drained completely and then repaired at the puncture.

My invention contemplates and has as a primary object the method of making an electric power transmission cable which floats even though punctured a number of times and which comprises a hollow conductive tube which is filled with gas expanded closed cell (cell-tight) cellular rubber and which is coated with an insulating layer of solid rubber.

Expanded cellular rubber is a product formed by the controlled expansion by chemical means or by externally applied gases of a quantity of rubber compound. The expansion is controlled so that individual cells are formed and so that the cell walls are not ruptured to form communicating channels. The finished product is a homogeneous structure of individual cells each completely surrounded by a film of rubber so that these cells are sealed and non-communicating (as in the Denton Reissue Patent No. 21,245).

The density of a rubber structure thus formed is comparatively low and has a ratio of rubber to gas of the order of 1–8. Another salient feature, in addition to the low density of the cellular rubber, is that it will not absorb water when immersed since the cell walls act as a barrier thereto.

These and other objects of my invention will now be apparent from the following figures taken in connection with the accompanying drawings in which.

In my power transmission cable, the electrical conductor is in the form of a hollow metallic tube preferably formed from sheet copper.

The sheet copper which is of suitable width is formed into a tube over a suitable tool and a secure joint is formed at the overlapping edges thereof.

Figure 1:
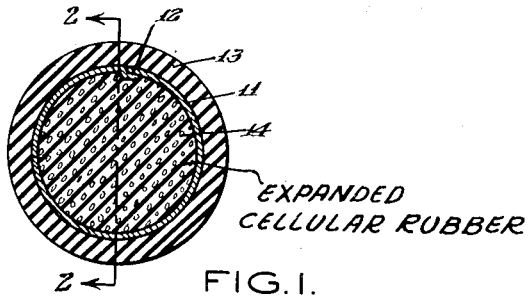
Figure 1 is an end cross-sectional view of my novel power transmission cable.

Thus, as illustrated in the cross-sectional view, Figure 1, the conductive copper tube 11 is sealed at 12 by a lap joint formed by suitably bending the metal thereof. There are various known processes for forming this type of tube from sheet stock and the final tube may have an axial seam 12 or a spiral seam. This seam may further be reinforced by the use of a solder or the like which is caused to flow thereover to prevent subsequent opening. If it is desirable, a butt joint may be formed between the edges of the sheet copper.

Figure 2:
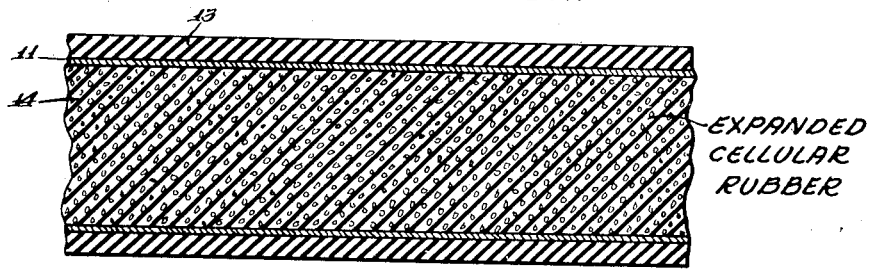
Figure 2 is a cross-sectional view of my power transmission cable taken along the line 2—2 of Figure 1.

The joint 12 of the copper tube need not be a water tight joint since a layer of solid rubber 13 covers the outer surface of the tubing. The cross-sectional area of the conductive material 11, as illustrated in Figures 1 and 2, is predetermined in accordance with the current carrying capacity required of the cable.

The thickness of the metallic sheet 11 is then adjusted so that the diameter of the completed cable illustrated will not be too great to preclude its being wound upon a cable reel of the usual diameter.

In accordance with the principles of my invention, the power transmission cable is filled with cellular expanded rubber 14 which, as previously mentioned, comprises a relatively low density homogeneous structure of rubber and gas, the gas being confined in individual closed cells.

This expanded rubber 14 is fabricated and placed within the copper tubing 11 in a manner to be hereinafter described so there is a natural tendency for the rubber 14 to adhere to the inner wall of the copper tube 11.

This low density cellular rubber is inserted into the tubing 11 during the fabrication from the sheet copper and the formed filled tubing is then passed through a conventional extrusion machine so that the rubber coat 13 may be applied thereto.

The thickness of the rubber coating 13 will, of course, depend upon such considerations as durability and the voltage at which the cable will be operated. The inside diameter of the copper tubing is determined by factors such as copper cross-section previously mentioned and the buoyancy desired. Thus, it is obvious that the larger the diameter of the copper tubing, the greater its buoyancy.

Again, as previously mentioned, these considerations of conductor diameter must be taken with a view towards winding the finished product upon a reel for transport. If the ratio of gas to rubber of the cellular structure 14 is of the order of 1-8, then the finished product is of comparatively low density and is thus able to float upon the surface of the water.

It is important to note that as a principal feature of the present invention, if the conductor is punctured in any way such as by a bullet, the cellular material will preclude the flow of water axially within the cable and will permit the water to come into contact with the copper 11 only at the point of the puncture.

The leakage of current from the area of contact between metal and water is, therefore, comparatively small, whereas it is evident that, if the cellular rubber structure 14 were removed, the influx of water to the inside of the tubing would permit contact over a considerable area and thus correspondingly large leakage currents.

On the other hand, it is important to note that the puncture of a hollow conductor which does not utilize the expanded closed cell rubber filler 14 would immediately cause the entire conductor to sink.

Figure 3:
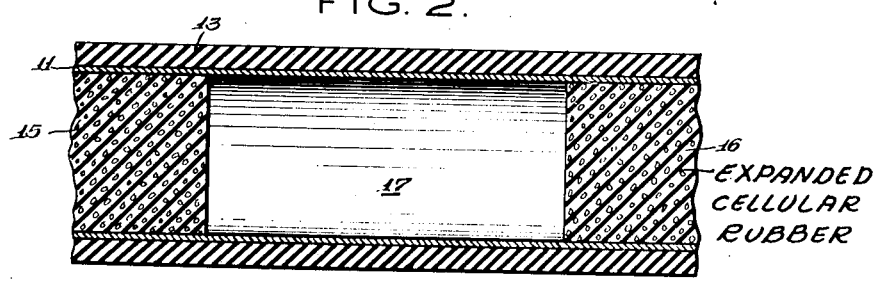
Figure 3 is an axial cross-sectional view of another modification of a buoyant power cable.

As a modification of the power transmission cable illustrated in Figures 1 and 2, I may fabricate a cable which utilizes considerably less of the sealed cell rubber while still permitting the floatation of the cable, even when punctured. Thus, as illustrated in Figure 3, a copper tubing 11, similar to that illustrated in Figures 1 and 2, is coated with a rubber extrusion 13 to preclude the normal influx of water and to prevent electrical contact between the copper conductor and the water. There is, however, a thermally conductive path between the copper conductor and the water which is necessary to keep the temperature low.

The copper tubing is filled, as illustrated, with individual sections of cellular closed cell rubber 15 and 16 which are spaced axially by a volume of air 17. Thus, since, as previously mentioned, the buoyancy of the gas expanded rubber is relatively great, it is possible for spaced small volumes thereof to float the entire cable even when sections thereof have been punctured.

As illustrated in Figure 3, the individual closed cell rubber sections 15 may be spaced by sections of air 17 which are equal in length to individual sections of rubber. Should a puncture occur in that section 17 filled with air, then the volume of water which will enter between the expanded rubber sections 15 and 16 will not be sufficient to cause the cable to sink.

Again, for reasons previously mentioned, the expanded rubber 15 and 16 will not absorb water.

If the filled sections such as 15 or 16 are punctured, then the effect would be similar to that previously described in connection with Figures 1 and 2.

In order to fabricate the cable illustrated in Figures 1, 2, and 3, it is necessary to provide closed cell expanded rubber sections which may be inserted into the copper tubing 11 while it is being formed. This may be accomplished, as illustrated in Figures 4 and 5, within a suitable cylindrical mold 21 which may be of seamless steel or the like.

The inside diameter of the steel tubing 21 is somewhat less than the inside diameter of the copper tubing 11 illustrated in Figures 1–3 so that the rubber product formed therein may be easily slipped into the copper tube. The length of the mold 21 will be determined by the length of the gassing chamber which is available for the gassing and expansion process.

Thus, in accordance with the general principles for manufacturing cellular closed cell expanded rubber, an extrusion machine may be utilized to form a continuous rubber cylinder 22. This cylinder, which may be one of the well known rubber compounds, is then subject to heat to vulcanize the compound just sufficiently to remove any tackiness or tendency to adhere to the metal walls.

Figure 4:
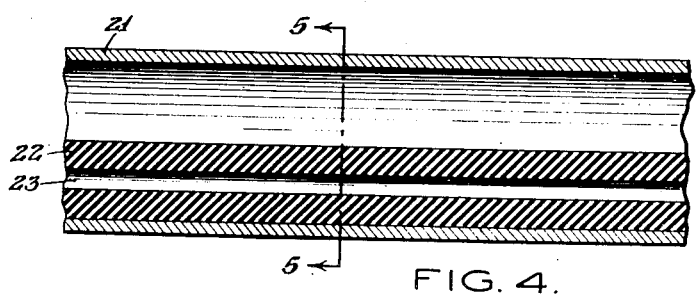
Figure 4 is an axial cross-sectional view of a mold adaptable for forming the individual lengths of expanded cellular rubber utilized in connection with my transmission cable.
Figure 5:
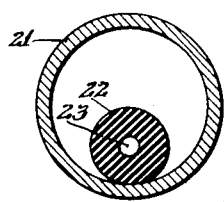
Figure 5 is an end cross-sectional view of a rubber mold taken along the line 5—5 of Figure 4.

Further, this partial vulcanization solidifies the rubber compound 22 so that it will retain its cylindrical shape when placed within the mold 21, as illustrated in Figures 4 and 5. If the mold 21 is of considerable length, various means may be utilized to facilitate the gassing of the rubber mixture 22. Thus, as illustrated, an axial perforation 23 may be formed in the rubber mix directly within the extrusion machine.

This thread, while preventing the collapse of the rubber compound 22 which would tend to seal the opening 23, is sufficiently porous to permit the gas under high pressure to flow; and thus, when the entire mold is placed in the gassing chamber, these threads will facilitate the absorption of gas.

Any perforations molded into the rubber prior to gassing are automatically and completely closed up when the rubber structure is expanded after partial vulcanization so that there cannot be leakage within the conductor.

In accordance with the usual procedure, therefore, the mold 21 containing the partially vulcanized rubber mixture 22 is placed within a gassing chamber and high pressure gas of the order of 5000 pounds per square inch is introduced as is well known in the art. At the same time, heat is applied to partially vulcanize the soft rubber.

Subsequent to this vulcanization, the high pressure gas within the autoclave or gassing chamber is slowly withdrawn and as a result the gases occluded within the rubber mixture 22 and retained therein by the partial set caused by partial vulcanization cause the expansion thereof so that the entire volume of the mold 21 is filled. The rubber is then fully vulcanized and set in its expanded form.

The expansion is restricted by the cylindrical mold 21 and also axial expansion is limited by the friction between the rubber and the walls of the mold. The quantity of rubber 22 introduced and the pressure of the gas utilized for the gassing process are predetermined so that the rubber 22 when expanded to fill the mold 21 contains independent closed cells having a gas pressure therein somewhat greater than atmospheric.

It is obvious, therefore, that when the expanded rubber is removed from the mold, there will be an immediate tendency for further expansion unless again confined by a cylindrical member. The expanded cellular rubber may be removed from the mold 21 by applying gas pressure at one end thereof or by utilizing a plunger which is forced into one end thereof.

However, in order to preclude the immediate expansion of the rubber as it is withdrawn from the mold, I may employ a process for temporarily stiffening the expanded cellular rubber. I may thus take the mold 21 and the confined expanded rubber and refrigerate it immediately after expansion so that the cell walls stiffen and thus resist the tendency of the internal gases to expand the rubber into a cylinder of larger diameter.

In its refrigerated form, the expanded rubber may be transported to the copper tubing machine or if it is desired, the entire mold 21 and the enclosed expanded rubber may be transported thereto. Of course, prior to the withdrawal of the rubber from the mold 21, it is necessary to refrigerate the rubber as previously described.

As was previously pointed out, the inside diameter of the steel mold 21 is somewhat less than the inside diameter of the copper tubing 11. Thus it is possible to take a section of refrigerated expanded rubber such as that formed within the mold 21 and insert it into the copper tube as it is being formed.

This insertion, of course, will be a comparatively simple operation as a result of the difference in diameter. If it is desired to form a cable such as that illustrated in Figure 2, that is, utilizing a continuous filler of expanded cellular rubber, then the refrigerated rubber cylinders taken from the molds 21 may be successively inserted so that the ends thereof are in physical contact. If, on the other hand, it is desired to form a power transmission cable such as that illustrated in Figure 3, the individual refrigerated rubber sections coming from the mold 21 may be inserted into the copper tubing 11 so that the ends are spaced from each other, as illustrated, by the air space 17.

As the power transmission cable is formed in the continuous process the rubber coating 13 is continuously applied by an extrusion machine. This rubber coat 13 may comprise a solid rubber compound and thus requires vulcanization after application. The application of heat to the rubber compound 13 to vulcanize the rubber will, in addition, heat the refrigerated cellular rubber which has been previously inserted into the copper tubing 11 and, as a result, the rubber cell walls will soften and immediately permit the enclosed gas to continue the previously restricted expansion and thus cause the cellular rubber 14, 15, or 16 to fill the entire volume within the copper tubing 11.

It has previously been mentioned that a comparatively strong bond is secured between the inner surface of the copper tubing 11 and the expanded cellular rubber sections 14, 15, and 16. This is accomplished by predetermining the diameter of the copper tubing 11 and the diameter of the mold 21 in addition to the rubber 22 inserted therein so that when the refrigerated expanded rubber expands further within the copper tubing 11, there will still be a residual pressure within the individual cells which is somewhat greater than atmospheric pressure. Accordingly, there will be a normal tendency for the expanded rubber 14, 15, and 16, Figures 1, 2, and 3, to expand into strong frictional contact with the inner wall of the copper tubing 11 and as a result axial displacement of the rubber will be impossible.

It is important to note that the closed cell expanded rubber 14 provides a material within the copper tubing 11 which normally tends to retain its cylindrical shape as illustrated. This is immediately apparent when, for example, the flexing of the cable about a reel occurs.

In this instance, there will be a tendency for the copper tubing 11 to collapse somewhat and consequently the individual cells within this area will be compressed. The compression of the closed cells will be accompanied by a rise in internal pressure above the normal pressure and hence a greater tendency to resume the normal cylindrical shape. Therefore, immediately, when the cable is uncoiled from the reel, the internal pressure will exert a force which will cause the conductor 11 to resume its cylindrical form. This feature is another decided advantage over the heretofore known hollow air filled floating cables.

In the fabrication of the expanded rubber sections 14, 15, and 16, various well known characteristics of rubber and its associated products may be taken into consideration. Thus, for example, since it is necessary to stiffen the rubber by the use of a refrigerating process, I have found that the addition of various compounds such as balata may be made in order to adjust the characteristics of the rubber to those required.

Thus the added mixture of a balata compound to the rubber mix 22 illustrated in Figures 4 and 5 will produce an expanded rubber which has a greater tendency towards set when refrigerated in the manner described.

I have discovered that this balata rubber compound may be readily refrigerated and transported in the refrigerated state to the point where it is to be inserted into the cables.

The finished product such as illustrated in Figures 1, 2, and 3 will, therefore, be a cable which is capable of floating; and thus two such cables may be employed to transmit power from a shore power station to a float upon a vessel such as a dredge or barge.

The use of such cables for the power transmission will prevent the sinking of the cable if punctured in any manner, and, accordingly, will prevent frequent shut downs of the vessels utilizing electrical power transmitted in this manner.

It will now be evident that the various disclosures described and illustrated in this application may be modified considerably by those skilled in the art of expanded rubber and electrical power transmission within the scope of the present invention. I prefer, therefore, to be bound, not by these specific disclosures, but only by the appended claims.

I claim:

1. The method of fabricating a power transmission cable comprising the steps of forming a conductive tubing inserting sections of expanded, sealed cell rubber into said tubing, said expanded rubber sections being of smaller diameter than the inside diameter of said tubing, said expanded rubber sections being only partially expanded when inserted; and coating the outer surface of said tubing with insulation.

2. The method of fabricating a power transmission cable comprising the steps of forming a conductive tubing, expanding a quantity of rubber compound within a cylindrical mold to form a cylindrical sealed cell rubber section within said mold, the inside diameter of said mold being less than the inside diameter of said tubing, said rubber being only partially expanded within said mold, refrigerating said expanded rubber within said mold, removing said refrigerated, partially expanded rubber from said mold, inserting said refrigerated partially expanded rubber into said tubing, and coating the outer surface of said tubing with a rubber compound.

3. The method of fabricating a power transmission cable comprising the steps of forming a conductive tubing, vulcanizing and expanding a quantity of rubber compound within a cylindrical mold to form a cylindrical sealed cell rubber section within said mold, the inside diameter of said mold being less than the inside diameter of said tubing, said rubber being only partially expanded within said mold, refrigerating said expanded rubber within said mold, removing said refrigerated, partially expanded rubber from said mold, inserting said refrigerated, partially expanded rubber into said tubing, coating the outer surface of said tubing with a rubber compound, and vulcanizing said outer rubber compound, said partially expanded rubber expanding further to fill said tubing.

HANS PFLEUMER.

REFERENCES CITED

The following references are of record in the file of this patent:

UNITED STATES PATENTS

| Number | Name | Date |
|---|---|---|
| 1,659,371 | Merrill | Feb. 14, 1928 |
| 1,913,198 | Geyer | June 6, 1933 |
| 1,939,843 | Darby | Dec. 19, 1933 |
| 1,977,325 | Pfannkuch | Oct. 16, 1934 |
| 2,048,811 | Peirce | July 28, 1936 |
| 2,140,552 | Roberts | Dec. 20, 1938 |
| 2,186,793 | Wodtke | Jan. 9, 1940 |

FOREIGN PATENTS

| Number | Country | Date |
|---|---|---|
| 358,373 | Great Britain | Oct. 8, 1931 |
| 358,967 | Great Britain | Oct. 14, 1931 |
| 499,906 | Great Britain | Jan. 31, 1939 |